(12) United States Patent
Chiu et al.

(10) Patent No.: US 7,359,129 B2
(45) Date of Patent: Apr. 15, 2008

(54) CLUTCHED JIG

(75) Inventors: Kuo-chuan Chiu, Tu-Cheng (TW); Feng-chi Lee, Tu-Cheng (TW); Yung-yi Chen, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 9 days.

(21) Appl. No.: 11/523,543

(22) Filed: Sep. 20, 2006

(65) Prior Publication Data
US 2008/0068732 A1    Mar. 20, 2008

(51) Int. Cl.
*G02B 3/00* (2006.01)

(52) U.S. Cl. ....................................................... 359/809

(58) Field of Classification Search ................ 359/809; 29/566, 564, 741
See application file for complete search history.

(56) References Cited
U.S. PATENT DOCUMENTS 3,535,763 A * 10/1970 Helton ........................ 29/741
4,172,317 A * 10/1979 Kober et al. .................. 29/566
5,553,382 A *  9/1996 Miller ........................ 29/896.9

\* cited by examiner

*Primary Examiner*—Hung Dang
*Assistant Examiner*—Vipin M Patel
(74) *Attorney, Agent, or Firm*—Rosenberg, Klein & Lee

(57) ABSTRACT

A clutched jig includes a housing and a clutching mechanism. The housing has a hollow hole formed along the axis of the housing, a conical hole formed in the end of the hollow hole. The clutching mechanism is received in the hollow hole of the housing. Each of clutching parts includes a bended part, a conical connecting part formed in the bottom of the bended part, and a crook located in the end of the conical connecting part. While the clutching mechanism is moved into the end of the housing, the conical connecting parts and the crooks extend out of the conical hole. The bended parts withstand the inner wall of the conical hole and are shifted inward. The conical connecting parts and the crooks are shifted inward by the bended parts driven. So a lens component is clutched out from a lens socket by the shifted of the crooks.

8 Claims, 11 Drawing Sheets

CLUTCHED JIG

BACKGROUND OF THE INVENTION

1. Field of the Invention

This present invention relates to a clutched device, and more particularly to a clutched jig for clutching a lens component from a lens socket.

2. The Related Art

It is difficult to clutch a lens component from a lens socket, especially the lens is base located in a mobile phone or other miniature electrical machine.

Referring to FIG. 11, a traditional separated jig 400 includes a housing 1 having a square shape. A square hole 2 is formed in the middle of the housing 1. A plywood 102 and three pressure plates 101 are formed in the housing 1 and protruded downward from each side of the housing 1, and the pressure plates 101 against the plywood 102. A lens module includes a lens component 200 and a lens socket 300, the lens component 200 is located in the lens socket 300. A groove 202 is formed in each corner of a base 201 of the lens component 200. A notch 302 is formed in each of the inner side of the lens socket 300. A leaf spring 301 is located in the notch 302 and corresponds with the grooves 202, the ends of the leaf springs 301 buckled in the grooves 202, so the lens component 200 is located firmly in the lens socket 300. The size of the lens socket 300 perfectly matches the separated jig 400.

While the separated jig 400 is inserted into the lens socket 300, the pressure plates 101 press the leaf springs 301, so the leaf springs 301 are pressed and pushed back into the notches 302, so the lens component 200 is not fastened by the leaf springs 301, at the same time the lens component 200 can be separated from the lens socket 300 by other jig device.

Accordingly, the traditional separated jig 400 just releases the lens component 200 located in the lens socket 300. The traditional separated jig 400 described above has a problem in that, the lens component 200 is not taken out easily from the lens socket 300 by the traditional separated jig 400.

SUMMARY OF THE INVENTION

An object of the invention is to provide a clutched jig including a housing, a clutching mechanism, a spring and a stop bar. The housing has a hollow hole being formed along the axis of the housing, a conical hole is formed in the end of the hollow hole, the top diameter of the conical hole is larger than the end diameter of the conical hole, two positional hole are arranged in the housing symmetrical; the clutching mechanism is slidably arranged in the housing, a top cover is formed in the top of the clutching mechanism, a plurality of clutching parts are formed in the end of the clutching mechanism, each of clutching parts includes a bended part located in the end of the clutching mechanism, a conical connecting part formed in the bottom of the bended part and a crook located in the end of the conical connecting part, the crooks define a receiving chamber, a received hole formed in the middle of the clutching mechanism, the received hole and the two positional hole are in a straight line; the spring covers on the clutching mechanism, one end of the spring against the housing and the other end against the top cover of the clutching mechanism; and the stop bar is arranged in the received hole and the two positional hole, while the clutching mechanism removed downward along the hollow hole of the housing, the conical connecting parts and the crooks extend out of the conical hole, the bended parts withstand the inner wall of the conical hole and the bended parts shift inward, and the conical connecting parts and the crooks inward shift by the bended parts driven.

Another object of the invention is to provide a clutched jig comprises a housing, the housing has a hollow hole being formed along the axis of the housing, a conical hole is formed in the end of the hollow hole, the top diameter of the conical hole is larger than the end diameter of the conical hole; and a clutching mechanism, the clutching mechanism is slidably arranged in the housing, a top cover is formed in the top of the clutching mechanism, a plurality of clutching parts are formed in the end of the clutching mechanism, each of clutching parts comprises a conical connecting part formed in the bottom of the bended part, a bended part located in the end of the conical connecting and a crook located in the end of the conical connecting part, the crooks define a receiving chamber, while the clutching mechanism removed downward along the hollow hole of the housing, the conical connecting parts and the crooks extend out of the conical hole, the bended parts withstand the inner wall of the conical hole and the bended parts shift inward, and the conical connecting parts and the crooks inward shift by the bended parts driven. So a lens component is clutched out of a lens socket by the clutched jig.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
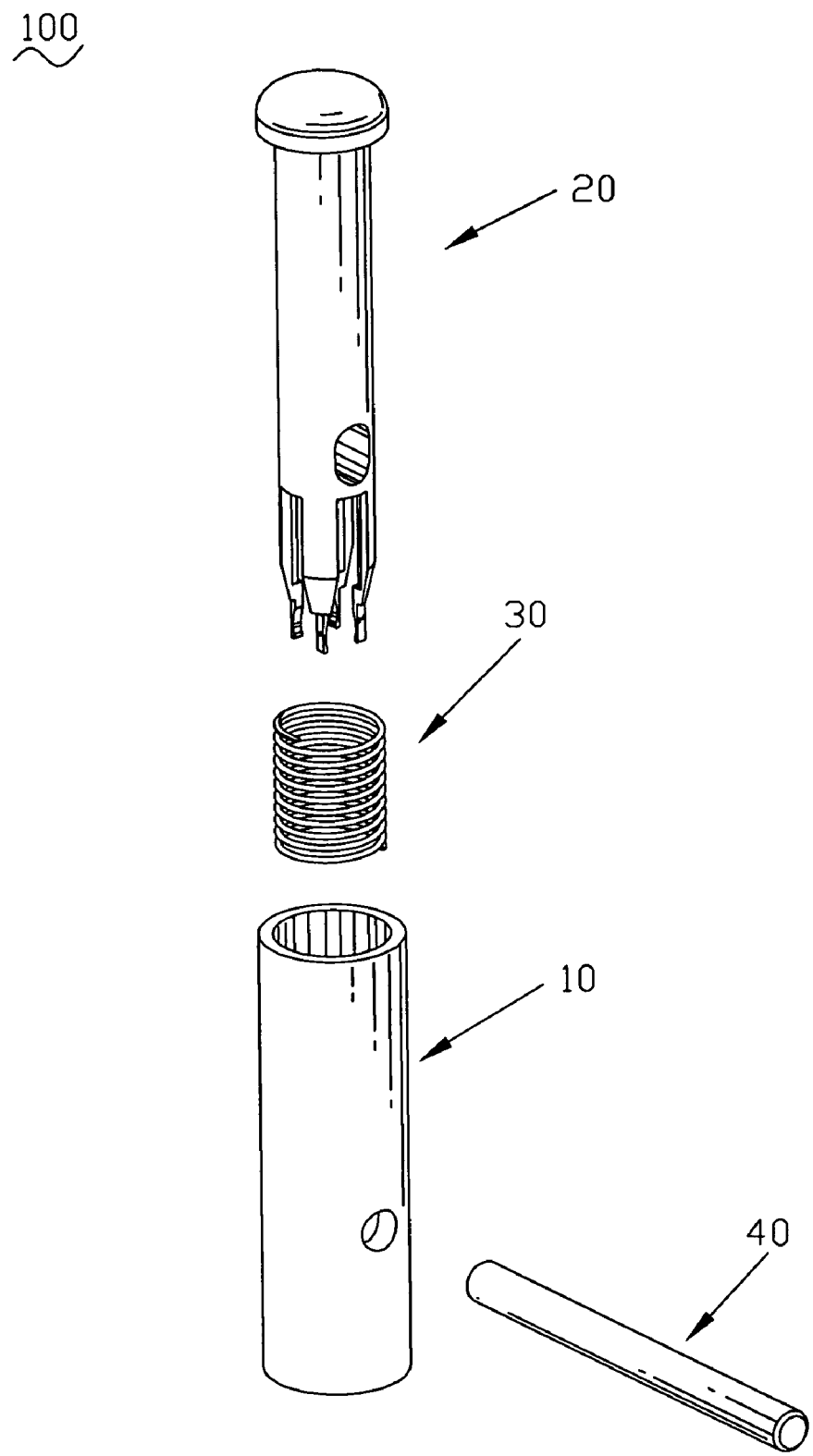
FIG. 1 is an exploded perspective view of a clutched jig according to the present invention.

First referring to FIG. 1, a clutched jig 100 according to the invention is shown. The clutched jig 100 comprises a housing 10, a clutching mechanism 20, a spring 30 and a stop bar 40.

Figure 2:
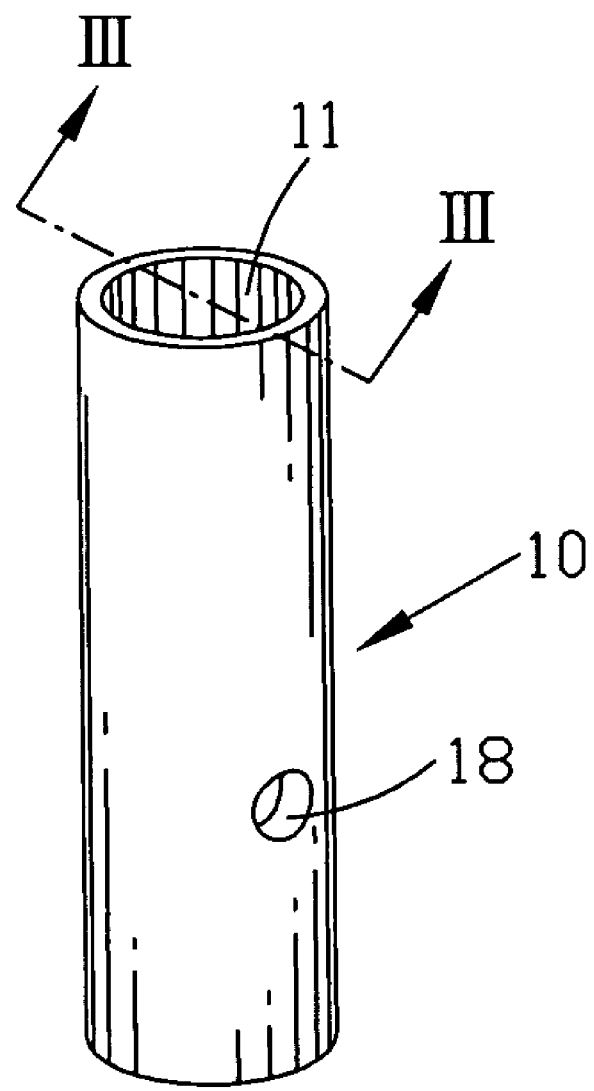
FIG. 2 is a perspective view of a housing of the clutched jig.
Figure 3:
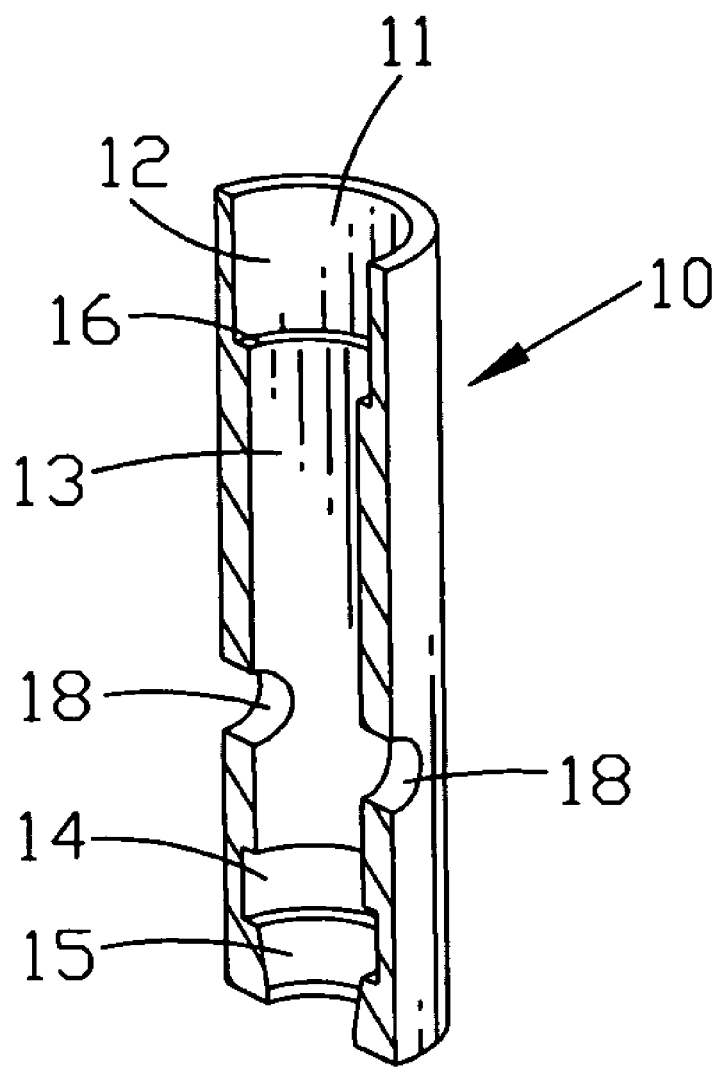
FIG. 3 is a cross-sectional view taken along line III-III of FIG. 2.

Referring to FIG. 2 and FIG. 3, the clutched jig 100 has a cylinder shape. The housing 10 has a hollow hole 11 which is formed along the axis of the housing 10. The hollow hole 11 along lengthways comprises a spring accepted hole 12, a middle hole 13, a machining hole 14 and a conical hole 15. The middle hole 13 is extended from the end of the spring accepted hole 12. The spring accepted hole 12 and the middle hole 13 have the same axis. The diameter of the spring accepted hole 12 is larger than the diameter of the middle hole 13. A first underside 16 is formed in the connecting position of the spring accepted hole 12 and the middle hole 13. The machining hole 14 is extended from the end of the middle hole 13. The diameter of the machining hole 14 is larger than the diameter of the middle hole 13. The conical hole 15 is extended from the machining hole 14. The top diameter of the conical hole 15 is larger than the end diameter of the conical hole 15. Two positional holes 18 are arranged in the middle of the housing 10 symmetrical. Further the two positional holes 18 transversely communicate the middle hole 13. Particularly, the positional holes 18 are circular holes.

Figure 4:
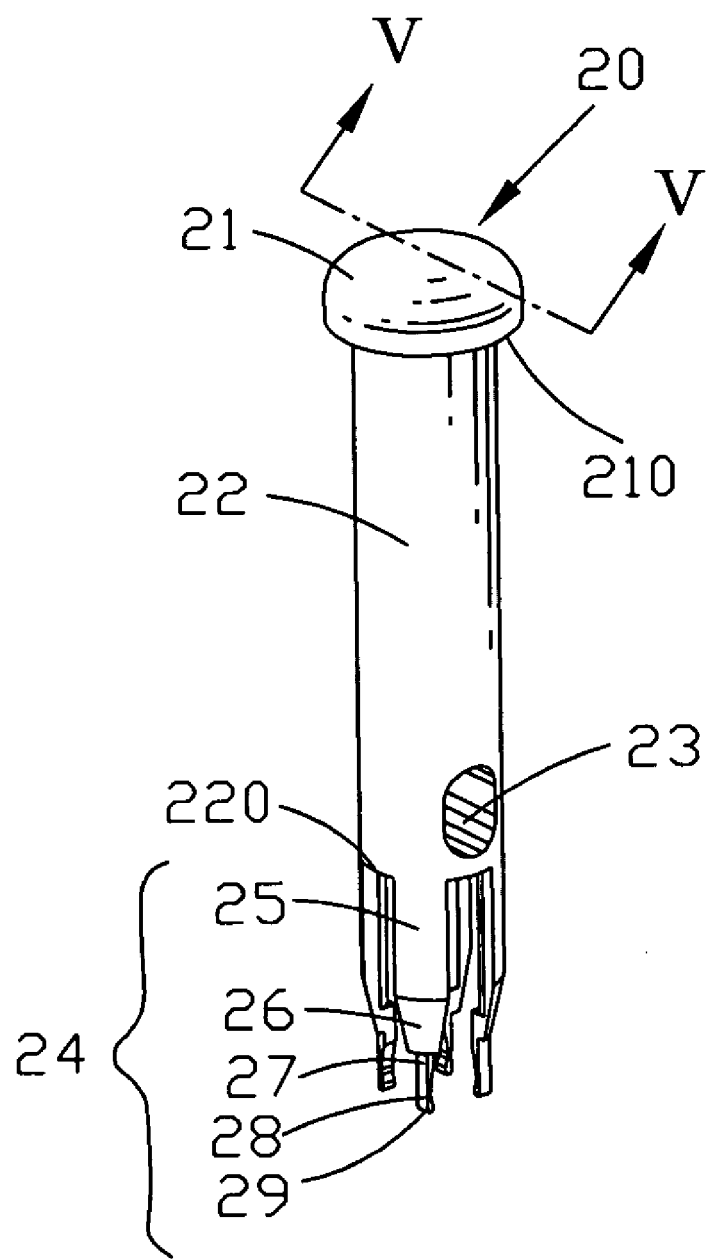
FIG. 4 is a perspective view showing the housing of the clutched jig.
Figure 5:
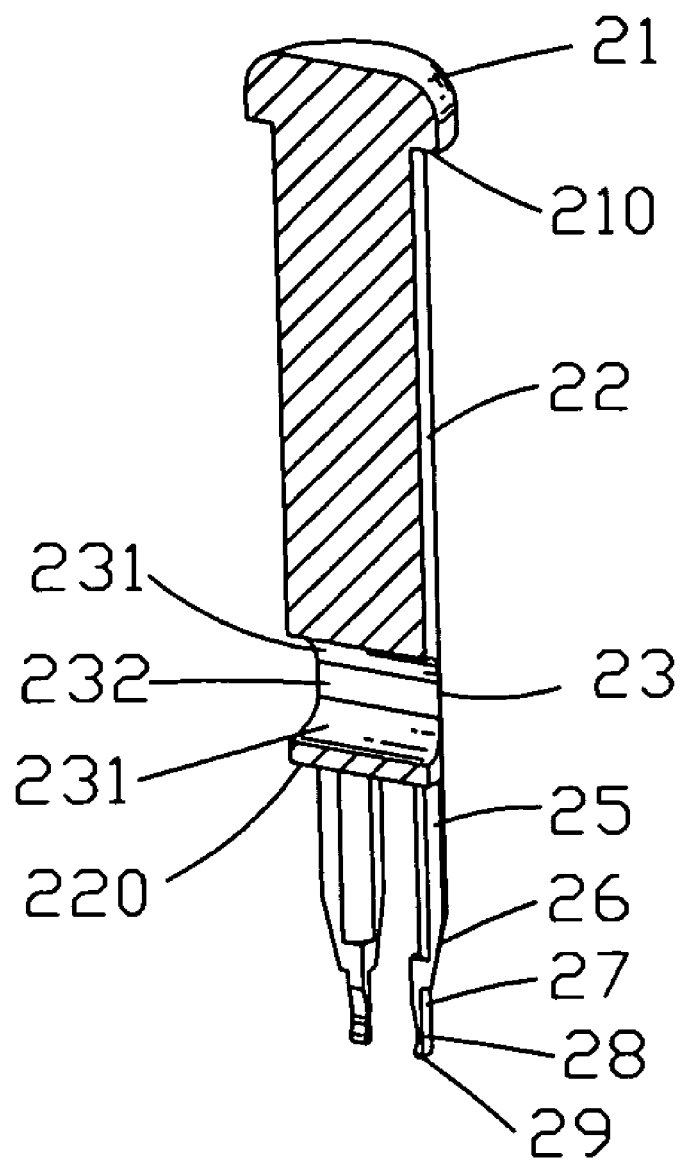
FIG. 5 is a cross-sectional view taken along line V-V of FIG. 4.

Please refer to FIG. 4 and FIG. 5, the clutching mechanism 20 comprises a top cover 21, a connecting cylinder 22 and four clutching parts 24. The top cover 21 has a columniform shape. The connecting cylinder 22 is extended from a first face 210 in the end of the top cover 21. The connecting cylinder 22 has a long columniform shape. A received hole 23 formed in the middle of the connecting cylinder 22. The received hole 23 in a vertical direction comprises an oblong aperture 232 and two semicircular apertures 231 connecting with the top of the oblong aperture 232 and the end of the oblong aperture 232. The four clutching parts 24 protrude downward from the end of the connecting cylinder 22. Each of clutching parts 24 includes a bended part 25, a conical connecting part 26 extended from the end of the bended part 25 and a crook 27 formed in the end of the conical connecting part 26. The four clutching parts 24 are equidistant arranged in the end of the connecting cylinder 22. Each of crooks 27 has a base 28. The base 28 sinks inwardly and formed a hook 29 in the end of the base 28. The neighboring crooks' direction is vertical. The four crooks 27 define a receiving chamber for providing a clipping function.

Please refer to FIGS. 1-4, the diameter of the stop bar 40 matches the diameter of the position hole 18 and the received hole 23. Particularly, the stop bar 40 is a columnar bar.

Figure 6:
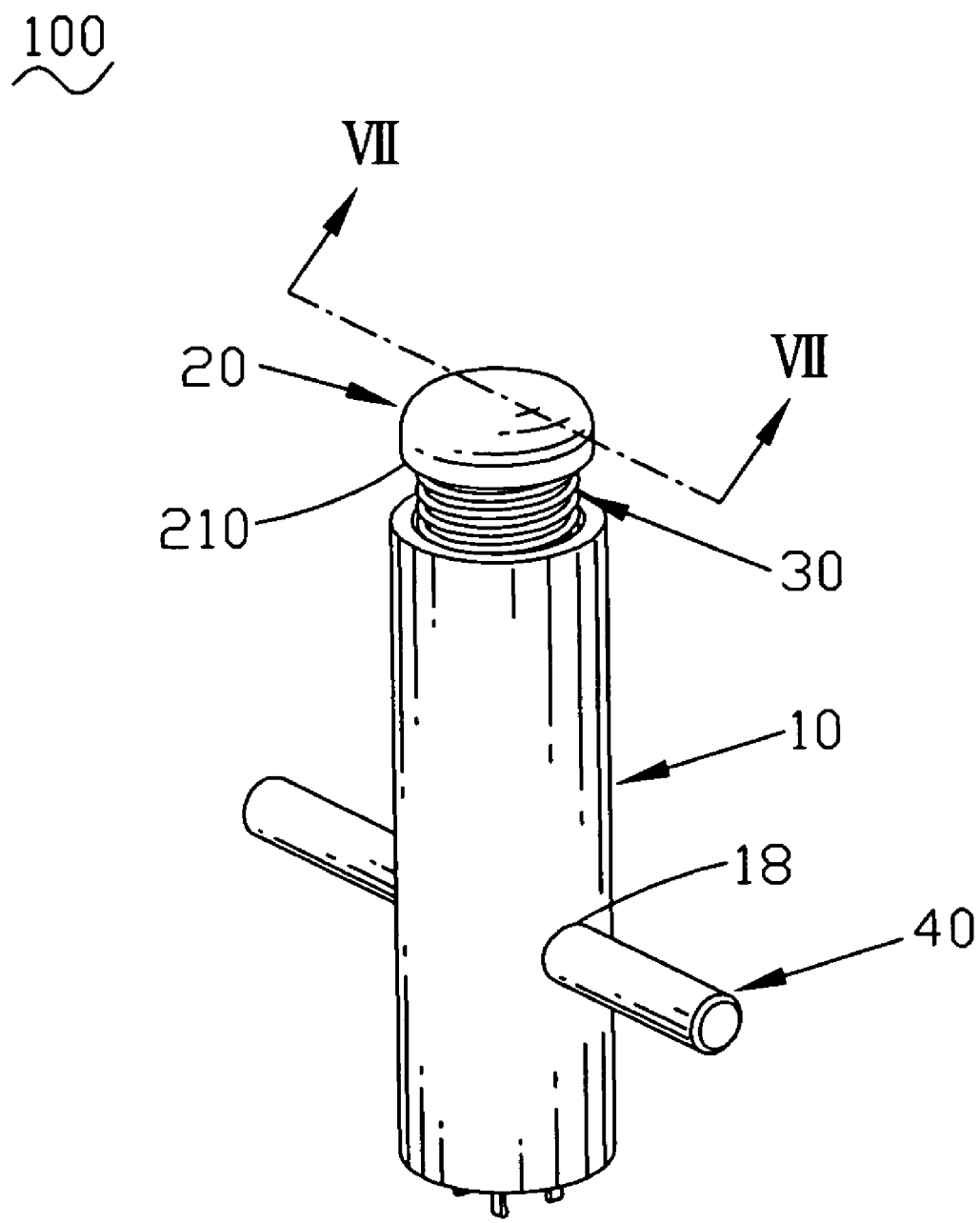
FIG. 6 is a perspective view of the assembly of the clutched jig.
Figure 7:
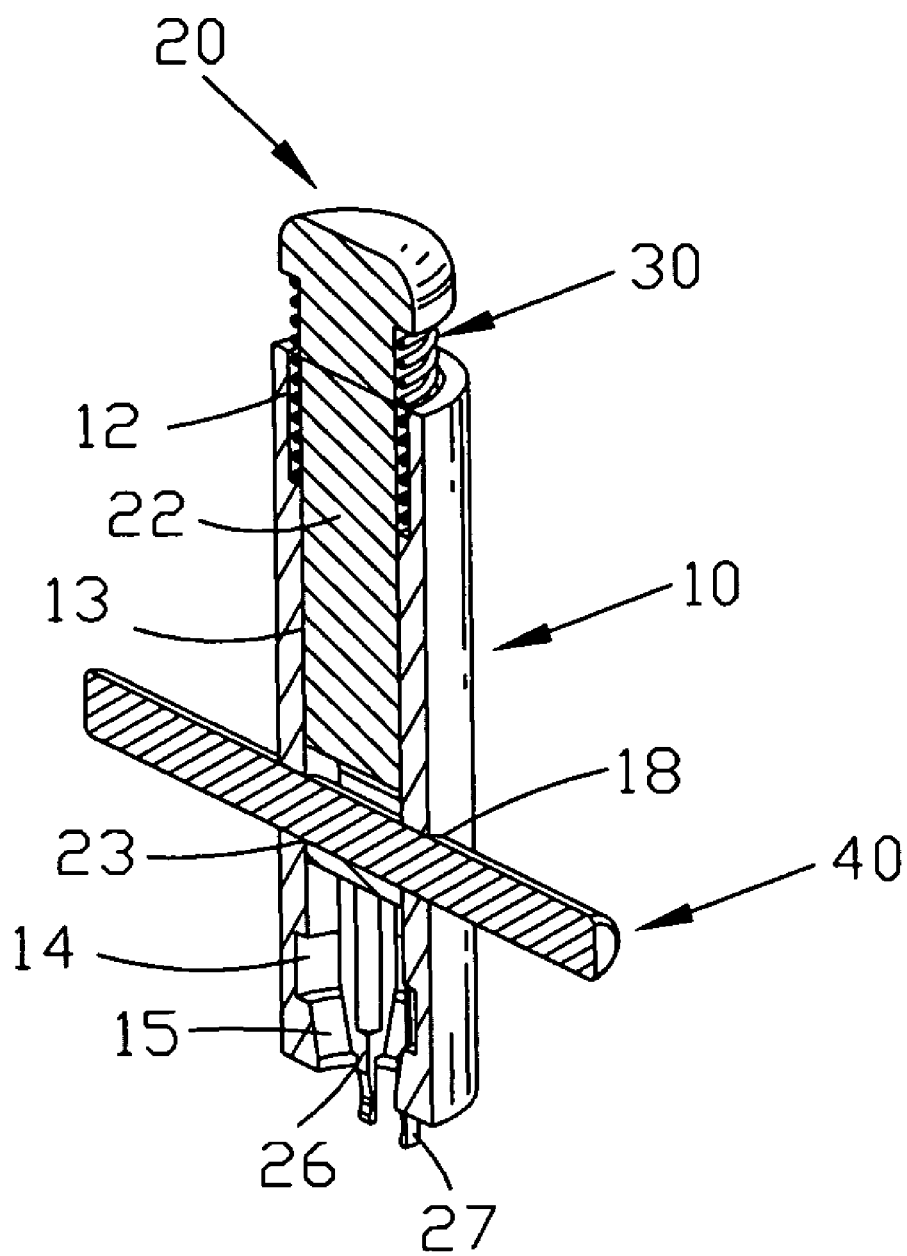
FIG. 7 is a cross-sectional view taken along line VII-VII of FIG. 6.

Please refer to FIGS. 6-7, the two figures expose the perspective view of the assembly of the clutched jig 100. The clutching mechanism 20 is arranged in the housing 10. The connecting cylinder 22 and the bended parts 25 are located in the spring accepted hole 12, the middle hole 13 and the machining hole 14. The four conical connecting parts 26 of the clutching mechanism 20 are located and against in the conical hole 15. The two positional holes 18 of the housing 10 and the received hole 23 are located in line. The stop bar 40 is located in the positional holes 18 and the received hole 23. The two ends of the stop bar 40 extend out of the surface of the housing 10. The stop bar 40 is against the two semicircular apertures 132 while the stop bar 40 moves upward or downward relative the received hole 23. The four conical connecting parts 26 are against the conical hole 15. The four crooks 27 extend out of the conical hole 15. The spring 30 covers the surface of the connecting cylinder 22 and is located in the spring accepted hole 12. One end of the spring 30 is against the first face 210 and the other end of the spring 30 against the first underside 16.

Figure 8:
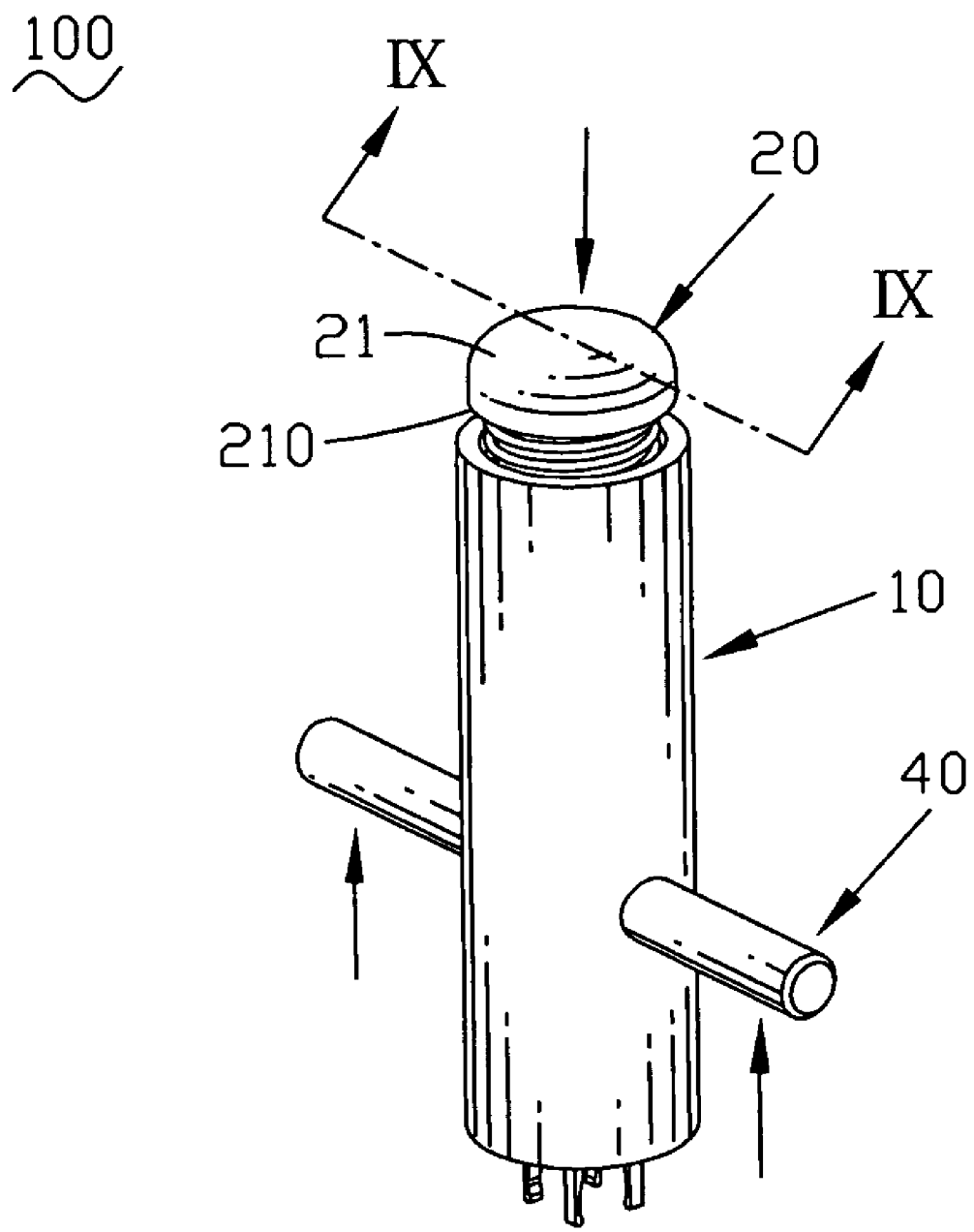
FIG. 8 is a perspective view of the clutched jig being used.
Figure 9:
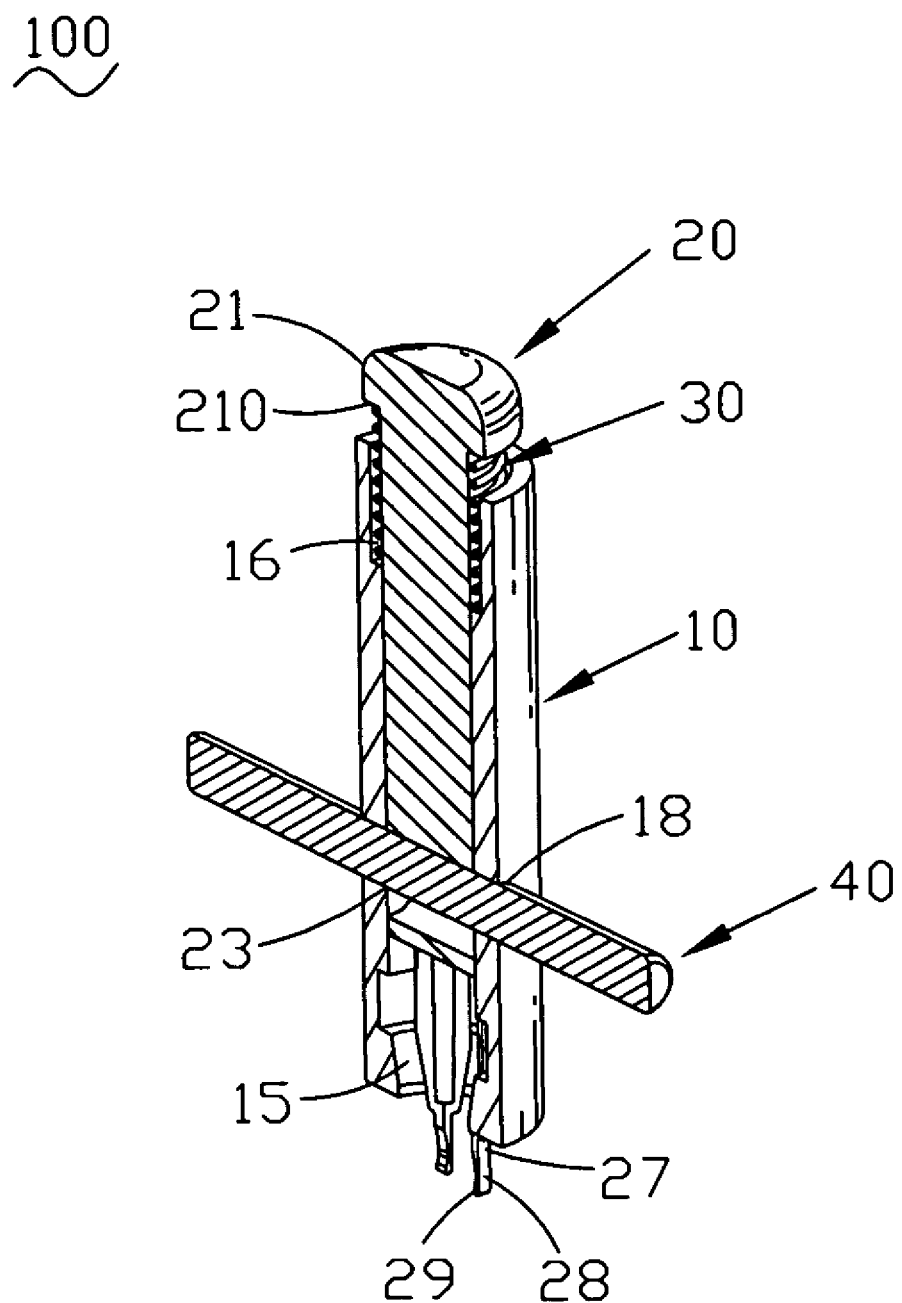
FIG. 9 is a cross-sectional view taken along line IX-IX of FIG. 8.

Referring to FIGS. 8 and 9, while the clutched jig 10 is deployed, the two ends of the stop bar 40 are pushed upward. At the same time, the top cover 21 is pushed downward. So the clutching mechanism 20 is moved downward along the hollow hole 11. The spring 30 is pushed downward by the first face 210 and also may be pushed upward by the first underside 16. The received hole 23 moves downward relative to the stop bar 40. The bended parts 25 move to the conical hole 15. The conical connecting parts 26 move out of the conical hole 15. The bended parts 25 withstand the inner wall of the conical hole 15 and are shifted inwardly if they are limited by the housing 10. Therefore the conical connecting parts 26 and the crooks 27 are shifted inward, driven by the bended parts 25.

Referring to FIGS. 6 and 7 again, while the clutched jig 100 finished clutch movement, the top cover 21 and the stop bar 40 are not pushed. In this case, the spring 30 returns to nature state. When the spring 30 pushes the clutching mechanism 20 moving relative to the housing 10, the received hole 23 moves upward relative to the stop bar 40 and the bended parts 25 remove upward and break away from the conical hole 15. Because the conical connecting parts 26 are located in the conical hole 15, the bended parts 25, the conical connecting parts 26 and the crooks 27 will return to the original state.

Figure 10:
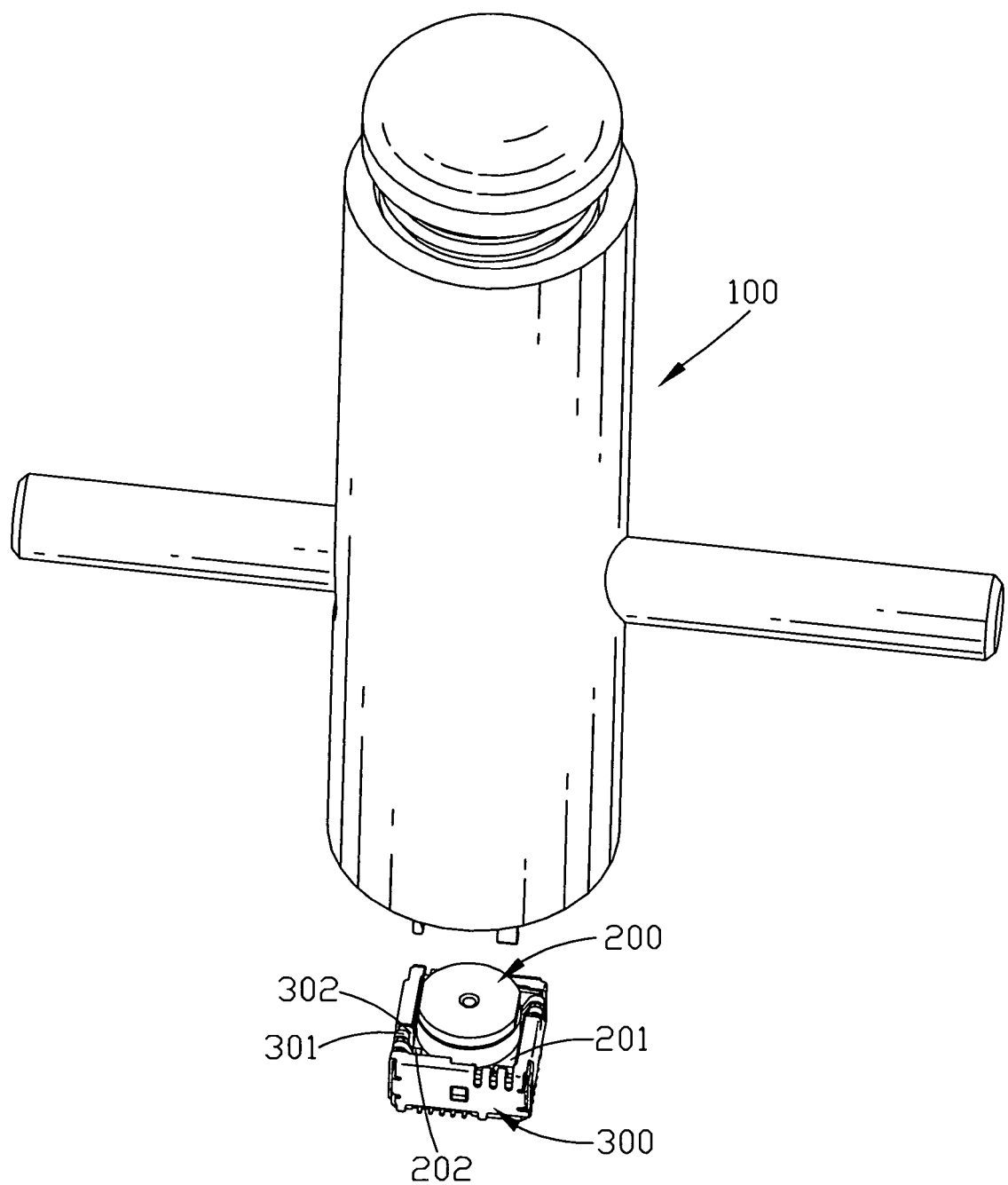
FIG. 10 is a perspective view of the use of the clutched jig and a lens module.
Figure 11:
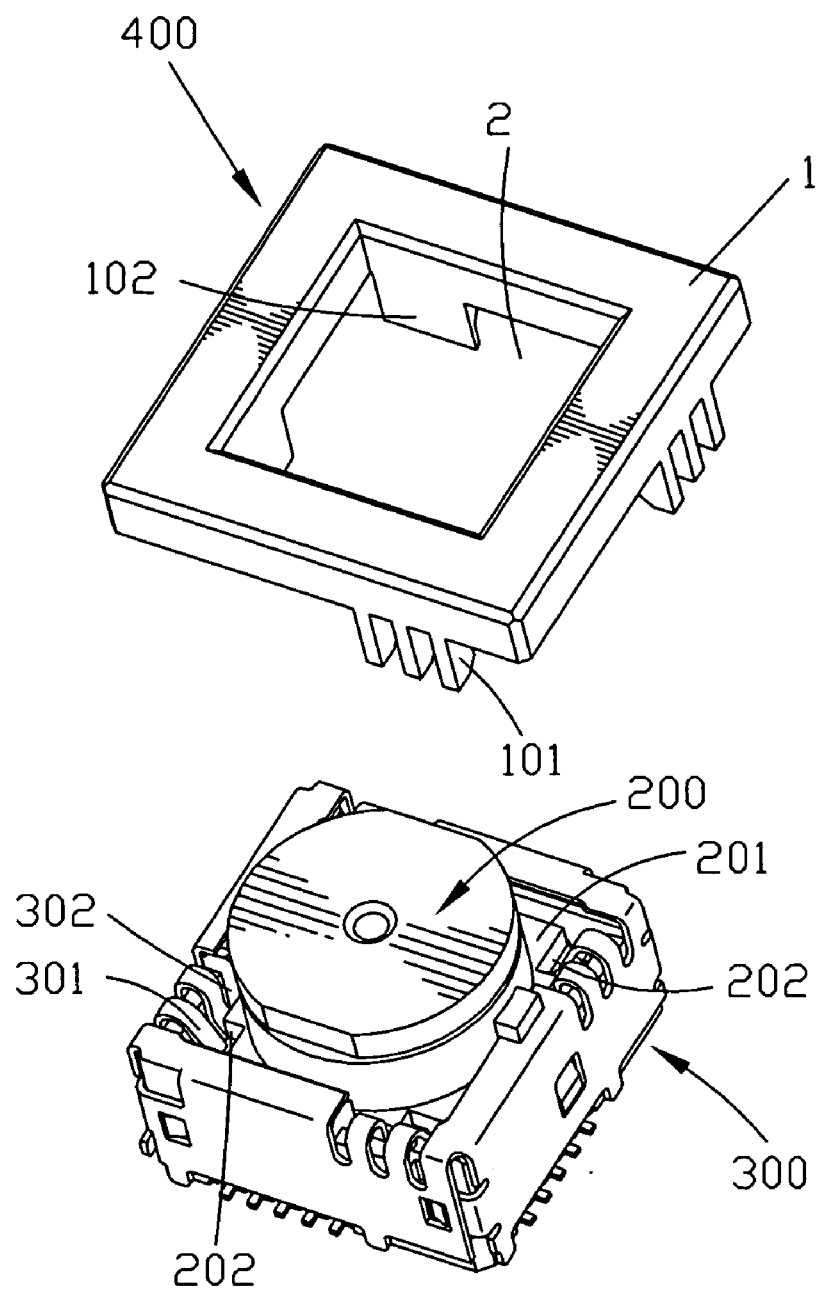
FIG. 11 a perspective view of the use of a traditional separated jig and a lens module.

Please refer to FIG. 10, a lens module includes a lens component 200 and a lens socket 300, the clutched jig 100 used to clutch a lens component 200. The lens component 200 has a round shape. The lens component 200 is located in the lens socket 300. Four grooves 202 are formed in each corner of the base 201 of the lens component 200. Four leaf springs 301 are located in each side of the lens socket 300 and correspond with the grooves 202. Since the ends of the leaf springs 301 buckled in the grooves 202, the lens component 200 is located firmly in the lens socket 300.

While the clutched jig 100 is at work, a user holds the clutched jig 100 and makes the clutched jig 100 aim at the lens component 200. By pulling the stop bar 40 upwardly, at the same time the top cover 21 being moving downward, so the four crooks 27 are inserted into the grooves 202 respectively. In this case, the leaf springs 301 fixed the lens component 200 are pushed into notches 302. The lens component 200 is released by the leaf springs 301. By the crooks 27 shifted inward the clutched jig 100 clutches firmly the lens component 200. Therefore when the user pulls the clutched jig 100 upwardly, the lens component 200 will be released from the lens socket 300. After then, the user slowly lays down the power on the two end of the stop bar 40 and the top cover 21. If the clutched jig 100 gets back to the original state, the contracted state of the crooks 27 slowly will be off. Hence, the lens component 200 is clutched out from the clutched jig 100.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A clutched jig used to clutch a lens component from a lens socket, comprising:
    a housing having a hollow hole being formed along the axis of the housing, the end of the hollow hole formed a conical hole, the top diameter of the conical hole being larger than the end diameter of the conical hole, two positional holes arranged in the housing symmetrically and communicating with the hollow hole;
    a clutching mechanism being accepted in the hollow hole of the housing, and having a top cover formed on the top thereof, clutching parts formed in the bottom end of the clutching mechanism, each of clutching parts having a bended part, a conical connecting part formed in the bottom of the bended part and a crook located in the end of the conical connecting part, the crooks defined a receiving chamber, a received hole formed in the middle of the clutching mechanism, the received hole and the two positional holes both located in line;

a spring having one end against the housing and the other end against the top cover of the clutching mechanism; and a stop bar arranged in the received hole and the two positional holes;

wherein the clutching mechanism moves downward relative to the housing, and the received hole moves downward relative to the stop bar, so the bended parts extend out of the conical hole and withstand the inner wall of the conical hole, the bended parts shifted inward, the conical connecting parts and the crooks shifted inward by the bended parts driven.

2. The clutched jig as set forth in claim 1, wherein the hollow hole along lengthways comprises a spring accepted hole, a middle hole extending from the end of the spring accepted hole and the conical hole extending from a machining hole, the diameter of the spring accepted hole being larger than the diameter of the middle hole, the diameter of the middle hole being equal to the top diameter of the conical hole, the top diameter of the conical hole being larger than the end diameter of the conical hole, the spring accepted in the spring accepted hole.

3. The clutched jig as set forth in claim 2, wherein the machining hole is formed between the middle hole and the conical hole, and the diameter of the machining hole is larger than the diameter of the middle hole.

4. The clutched jig as set forth in claim 1, wherein the clutching mechanism further comprises, a connecting cylinder extending from a first face in the end of the top cover, and the clutching parts extending from the end of the connecting cylinder, the top cover being against downward the spring, the received hole located in the connecting cylinder.

5. The clutched jig as set forth in claim 4, wherein a surface of the connecting cylinder extends downward and forms an outer surface of the bended parts.

6. The clutched jig as set forth in claim 4, wherein the clutching parts comprises four clutching parts, each clutching part having a base, the base sinks inwardly and forming a hook in the end of the base, each of two neighboring crooks' direction is vertical, and each crook defined a receiving chamber.

7. The clutched jig as set forth in claim 1, wherein the diameter of the stop bar matches the received hole of the housing.

8. The clutched jig as set forth in claim 7, wherein the received hole in vertical direction comprises an oblong aperture and two semicircular apertures connecting with the oblong aperture.

* * * * *